W. H. LUCAS.
SAW TOOTH GRINDING MACHINE.
APPLICATION FILED SEPT. 16, 1908.

938,159.

Patented Oct. 26, 1909.
3 SHEETS—SHEET 2.

W. H. LUCAS.
SAW TOOTH GRINDING MACHINE.
APPLICATION FILED SEPT. 16, 1908.

938,159.

Patented Oct. 26, 1909.
3 SHEETS—SHEET 3.

Witnesses
Harry L. Smith.
Hamilton D. Turner

Inventor
William H. Lucas
by his attorneys
Smith & Frazier

UNITED STATES PATENT OFFICE.

WILLIAM H. LUCAS, OF PHILADELPHIA, PENNSYLVANIA, ASSIGNOR TO FRED F. ESPEN, JACOB ESPEN, JR., AND WILLIAM H. LUCAS, ALL OF PHILADELPHIA, PENNSYLVANIA.

SAW-TOOTH-GRINDING MACHINE.

938,159.    Specification of Letters Patent.    Patented Oct. 26, 1909.

Application filed September 16, 1908. Serial No. 453,322.

*To all whom it may concern:*

Be it known that I, WILLIAM H. LUCAS, a citizen of the United States, residing in Philadelphia, Pennsylvania, have invented certain Improvements in Saw-Tooth-Grinding Machines, of which the following is a specification.

My invention relates to a machine especially designed for grinding the teeth of metal cutting saws, the object of my invention being to provide for this purpose an automatic machine capable of grinding the front, the back or the cutting face of the tooth, and of grinding the latter either flat or with any desired degree of bevel, or of beveling alternate teeth in reverse directions.

Figure 1:
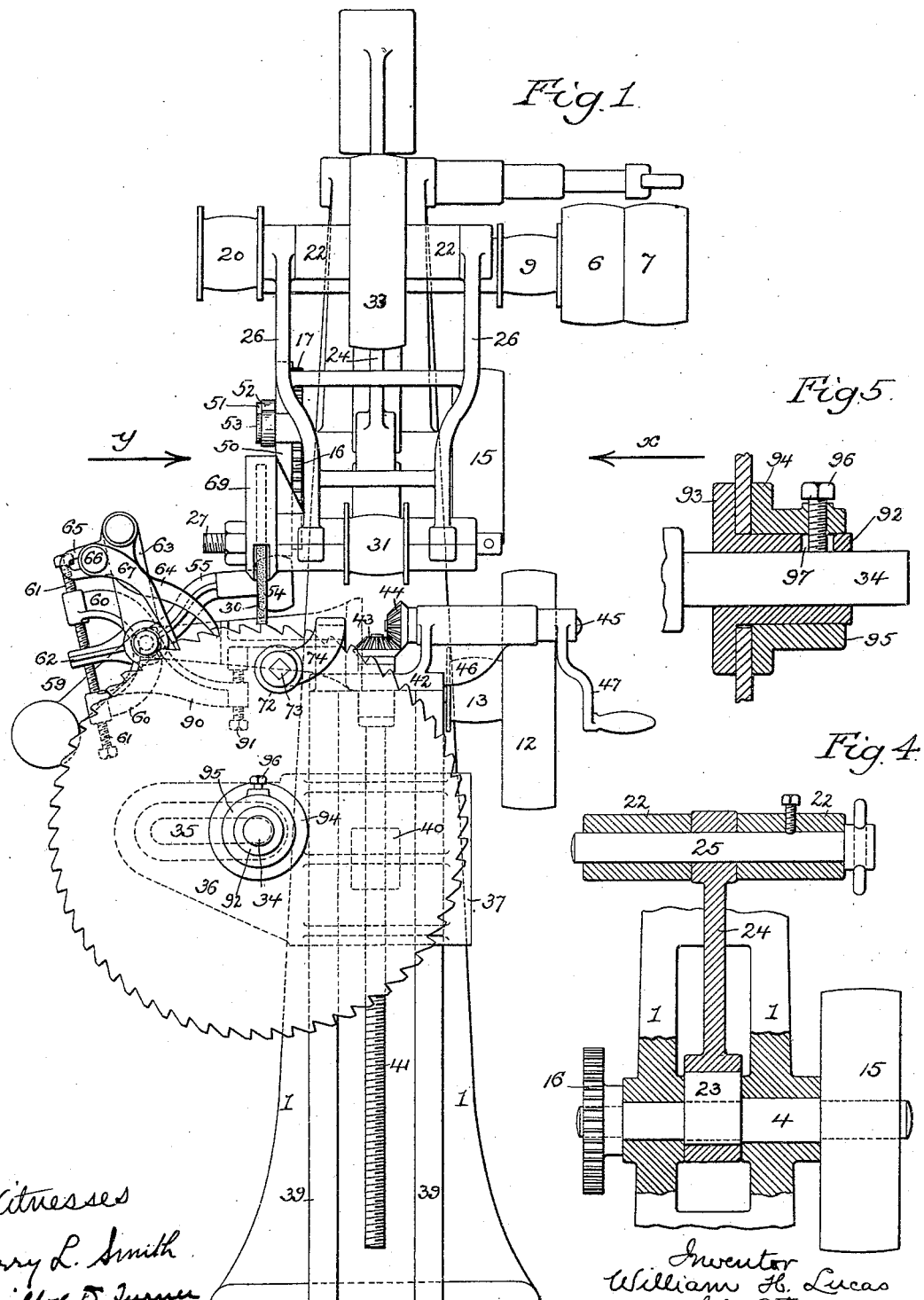
Figure 2:
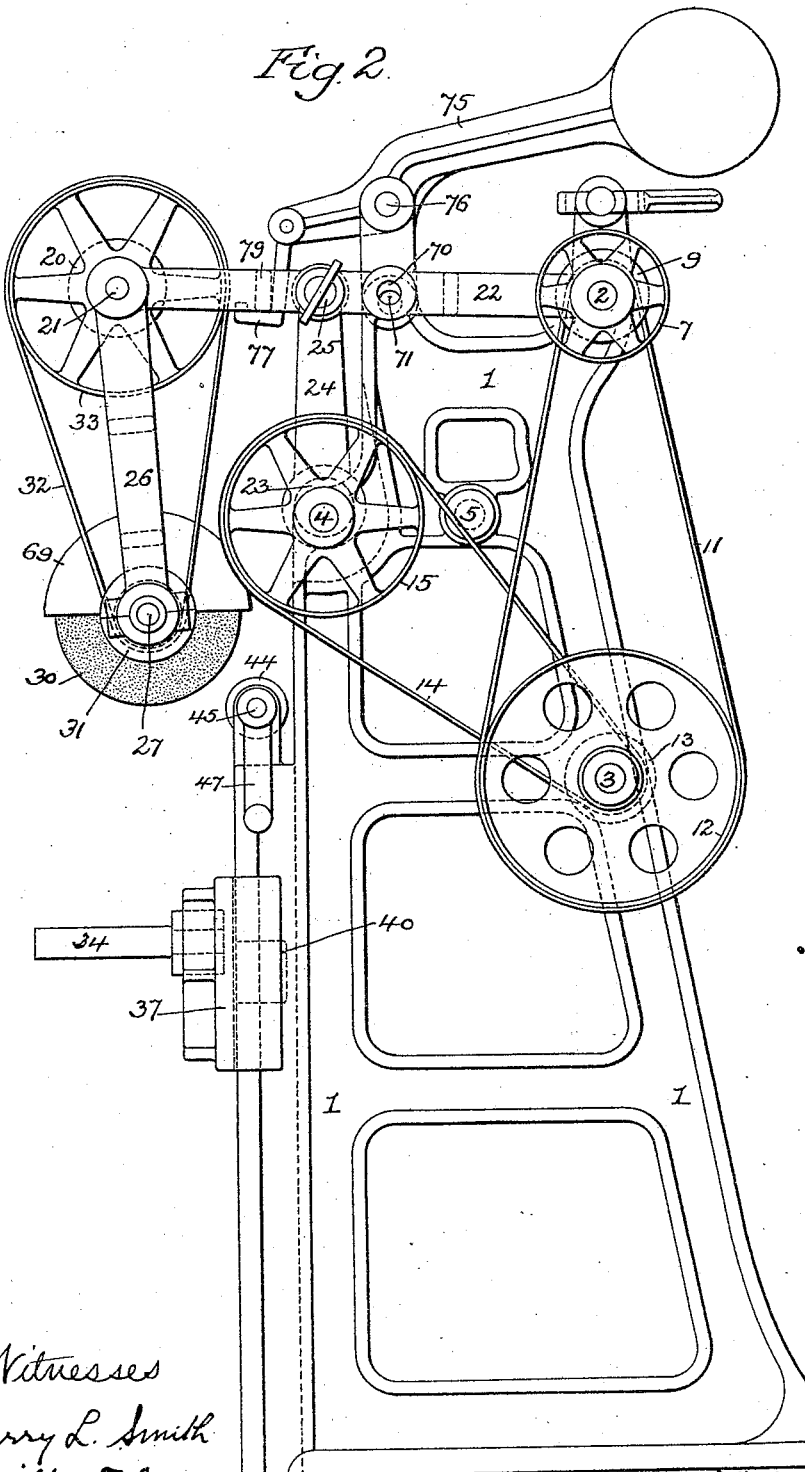
Figure 3:
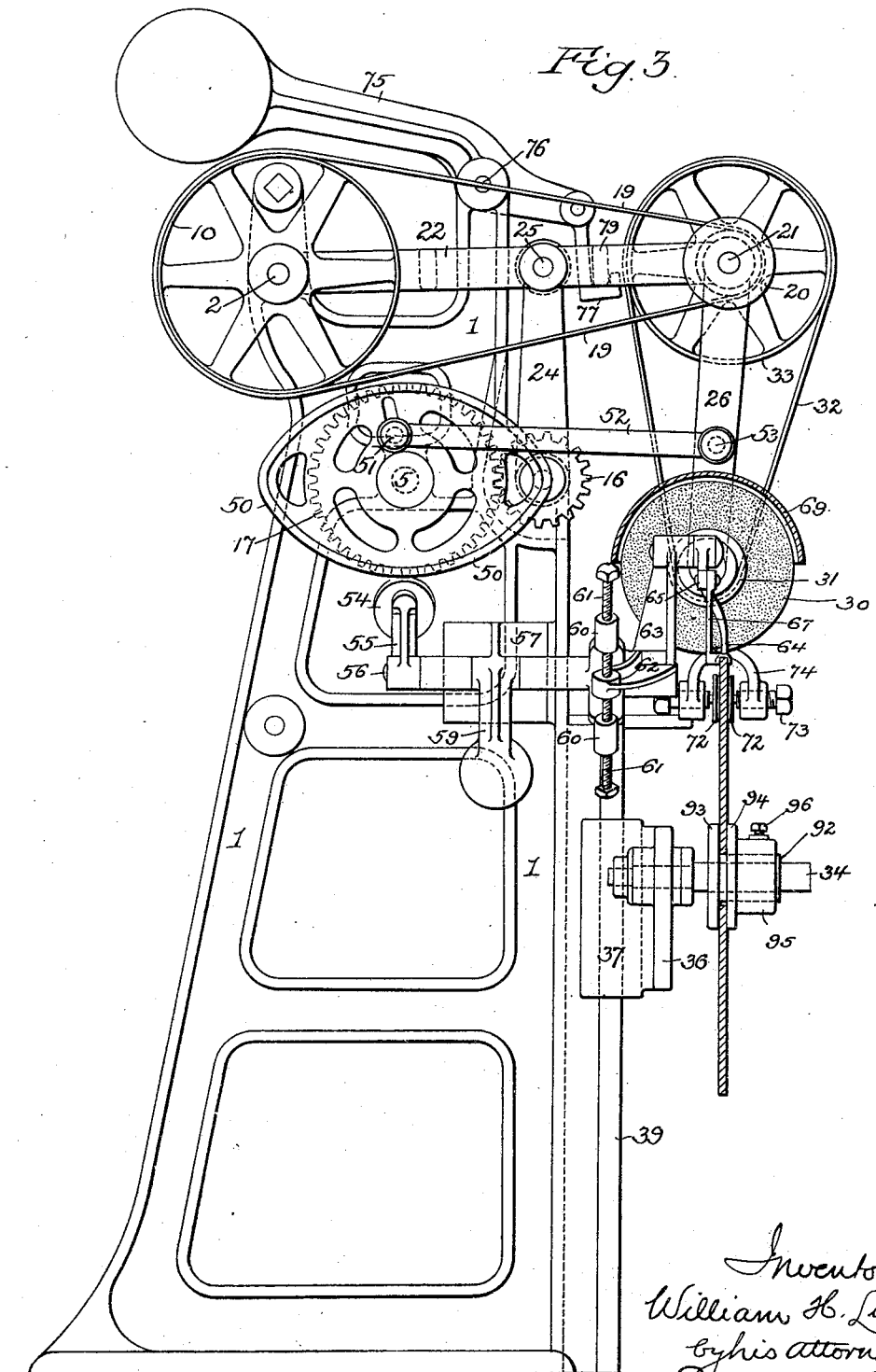

In the accompanying drawings: Figure 1 is a front view of a saw tooth grinding machine constructed in accordance with my invention; Fig. 2 is a side view of the same looking in the direction of the arrow $x$, Fig. 1; Fig. 3 is a side view looking in the direction of the arrow $y$, Fig. 1; Fig. 4 is an enlarged transverse section of part of the machine, and Fig. 5 is a longitudinal section of another part of the same.

In each of the side views the mechanism on the opposite side of the machine has been omitted in order to avoid confusion, and in Fig. 1 the belts applied to the various pulleys have been omitted for the same reason.

The main frame or standard 1 of the machine has bearings for four shafts 2, 3, 4 and 5, the shaft 2 being the primary driving shaft of the machine and having thereon four belt pulleys 6, 7, 9 and 10, the pulley 6 being a fast pulley and the pulley 7 a loose pulley, either of which is adapted for the reception of the driving belt, the pulley 9 receiving a belt 11 which drives a pulley 12 on the shaft 3. Another pulley 13 on said shaft 3 serves, by means of a belt 14, to drive a pulley 15, on the shaft 4, the latter shaft having, at the end opposite to that which carries the pulley 15, a spur pinion 16 which meshes with a spur wheel 17 on the shaft 5. The pulley 10 on the shaft 2 drives, by means of a belt 19, a pulley 20 at one end of a shaft 21 which is rotatably mounted in bearings 50 in the forward end of a swinging carrier frame 22, the latter being pivotally mounted upon the shaft 2 or upon the bearings for the said shaft, and being susceptible of vibration under the action of an eccentric 23 on the shaft 4, the strap of said eccentric having an arm 24 which is connected to the frame 22 by means of a detachable transverse pin 25 (see Fig. 4).

Depending from the outer end of the carrier frame 22 is a swinging hanger frame 26 whose lower portion is provided with bearings for a shaft 27 and to the latter is secured the emery wheel 30 or other grinding device, said shaft being also provided with a belt pulley 31 which is driven by a belt 32 from a pulley 33 on the shaft 21 at the forward end of the frame 22.

The saw whose teeth are to be ground is carried by a spindle 34 which is laterally adjustable in a slot 35 formed in a bracket 36 projecting laterally from a sliding head 37, the latter being vertically guided between opposite flange members 39 on the main frame 1, and having a rearwardly projecting nut 40, which engages a vertical screw shaft 41 rotatably mounted in but vertically confined to a cross bar 42 on the main frame, the upper end of said screw shaft 41 being provided with a bevel pinion 43 which meshes with a similar pinion 44 at the inner end of a shaft 45, the bearing for the latter shaft being formed in a bracket 46 and said shaft being provided, at its outer end, with a crank handle 47, whereby it may be readily turned in order to raise and lower the sliding head 37 in accordance with the diameter of the saw whose teeth are to be ground, the lateral adjustment of the spindle 34 in the slot 35 providing any desired degree of lateral offset for the axis of rotation of the saw blade in respect to the grinding disk 30 which may be required by the undercutting of the forward faces of the teeth of the saw. When the front or back faces of the teeth are to be ground the periphery of the disk 30 is suitably beveled to accord with the bevel of the backs of the teeth, but when the cutting faces of the teeth are to be ground the grinding disk has a substantially flat face.

The shaft 5 is provided with a cam 50 and on the face of the latter is a radially adjustable crank pin 51 which pivotally engages the inner end of a bar 52 whose outer end is in pivotal engagement with a stud or pin 53 on the depending hanger frame 26, the result being that the grinding disk 30 travels in a curved path whose back and forth components are derived from the crank pin 51, and whose vertical components are derived from the eccentric 23, the character of this curved path being susceptible of considerable variation by reason of the variation in the extent of its back and forth components provided for by the variable throw of the crank pin 51. The cam 50 acts upon an anti-friction roller 54 mounted upon the inner end of an arm 55 which is secured to a rock shaft 56 free to turn in bearings in a bracket 57 on the side of the fixed frame 1, said rock shaft having a weighted lever 59, which tends to move the roller 54 toward the cam 50, this movement being limited by contact of a bracket on the main frame with a set screw 91 carried by an arm 90 of the lever 9 (see Fig. 1). The rock shaft 56 also has a fork 60, each of whose members carries an adjusting screw 61 the inner ends of these adjusting screws engaging with an arm 62 of a bell crank lever which is free to swing upon the forward end of the rock shaft 56, the other arm 63 of said lever having pivotally mounted upon it a pawl 64 which engages with the teeth of the saw and serves to impart forward movement to the latter.

From the back of the pawl 64 projects a slotted arm 65 for the reception of a laterally adjustable pin 66, upon which is pivotally mounted a pawl 67, which also engages with a tooth of the saw one or more teeth removed from that with which the pawl 64 engages, whereby there will be no cessation in the feeding movement of the saw in case of a broken tooth, as there would be if only a single pawl were employed. The slotted arm 65 provides for the adjustment of the pawl 67 in respect to the pawl 64 to suit different sizes of teeth.

A hood 69 secured to the swinging frame 26 covers and protects the upper portion of the grinding disk 30.

As shown in the drawing, the cam 50 is a duplex cam, consequently there will be two swinging movements of the pawl-carrying lever for each rotation of the shaft 5 and the gear wheels 16 and 17 are so proportioned that there will be two rotations of the eccentric shaft 4 for each rotation of the cam shaft 5, hence there will be a feed of the saw blade to the extent of two teeth for each complete back and forth swing of the frame 26 and its grinding disk. Each back and forth swing of said disk is accompanied by two up and down movements of the same, consequently if the grinding disk is intended to bevel in opposite directions the cutting faces of successive teeth, said disk will act on the downward movement at the outer end of its swing upon the outer portion of the cutting face of one tooth and on the downward movement at the inner end of its swing upon the inner portion of the cutting face of the next tooth, the angle of the bevel being dependent upon the relative extent of the to-and-fro and vertical components of the curved path in which the grinding disk moves, and these can be determined by the radial adjustment and consequent throw of the crank pin 51. If a constant bevel is desired, the adjustment of the crank pin 51 may be dispensed with and if it is desired to impart a V-shape to the cutting face of each tooth a single cam will replace the duplex cam 50, or if the cutting faces of the teeth are to be ground flat, the vertical movements of the grinding disk may be dispensed with. In the latter case the frame 22 is disconnected from the eccentric 23 by withdrawing the pin 25 which serves to connect said frame to the arm 24 of the eccentric sleeve and said frame 22 can then be rigidly locked in horizontal position by engaging said pin 25 with an opening 70 in said frame 22 and an opening 17 in the fixed frame 1 of the machine, these openings being illustrated in Fig. 2.

In order to prevent any side spring or displacement of the toothed periphery of the saw under the action of the grinding disk 30, the opposite sides of the saw are engaged at a point close to the toothed periphery of the same by presser disks 72 which are carried by screws 73 adapted to threaded openings in the opposite forks of a yoke 74 secured to or forming part of the fixed frame of the machine, as shown in Figs. 1 and 3.

By reason of the facility afforded for adjusting the pawl-carrying lever in respect to the arms of the yoke 60 on the rock shaft 56, the forward termination of the stroke of each pawl can be so regulated as to bring any portion of a tooth under the action of the grinding disk 30, whereby the latter may be caused to act upon either the back of a tooth, the front face of the same or the peripheral or cutting face, and by reason of the regulation of the backward movement of the rock shaft by the arm 90 and set screw 91, the machine can be readily adapted to the size or length of the teeth which are to be ground, the machine being thereby rendered universal in its operation.

In order to relieve the eccentric 23 from the weight of the frame 22 and of the parts carried thereby, a weighted lever 75 is hung to a transverse pin 76 at the top of the frame 1, this lever having a depending hook 77 which engages a cross bar 79 on the frame 22, as shown in Figs. 2 and 3.

The saw is not mounted directly upon the spindle 34 but upon a sleeve 92 which enters the eye of the saw and has a collar 93 which bears upon the inner side of the saw. Mounted upon the sleeve 92 is an adjustable collar 94 for bearing upon the outer side of the saw and guiding the same in its rotation, a hub 95 on the collar 94 having a threaded opening for the reception of a set screw 96 which passes through a slot 97 in the sleeve 92, whereby the hub and sleeve are secured to the spindle 34, after they have been properly adjusted thereon. The path of movement of the periphery of the grinding disk 30 always bears the same relation to that portion of the eye of the saw which rests upon the sleeve 92 consequently, after the grinding of the teeth of the saw has been completed, said teeth must necessarily be perfectly concentric with the eye of the saw, and the true running and perfect operation of the saw are thereby insured.

I claim:—

1. The combination, in a saw tooth grinding machine, of means for mounting and rotating the saw, a grinding disk, a swinging hanger frame carrying the same, a swinging carrier frame upon which the hanger frame is pivotally mounted, means for vibrating the hanger frame in one direction so as to carry the grinding disk back and forth across the toothed periphery of the saw, and means connected to the carrier frame independently of the hanger frame for vibrating said carrier frame in another direction so as to raise and lower the grinding disk.

2. The combination, in a saw tooth grinding machine, of means for mounting and rotating the saw, a grinding disk, a swinging hanger frame carrying the same, a swinging carrier frame upon which the hanger frame is pivotally mounted, means for vibrating the hanger frame in one direction so as to carry the grinding disk back and forth across the toothed periphery of the saw, means connected to the carrier frame independently of the hanger frame for vibrating the said carrier frame in another direction so as to raise and lower the grinding disk, and means for varying the extent of movement of one of said frames so as to change the path of travel of the grinding disk in respect to the toothed periphery of the saw.

3. The combination, in a saw tooth grinding machine, of means for mounting and rotating the saw, a grinding disk, a swinging hanger frame carrying the same, a pivotally mounted carrier frame upon which the hanger frame is pivotally mounted, means for vibrating the hanger frame in one direction, means detachably connected to the carrier frame for vibrating the same in another direction, and means for locking said carrier frame in fixed position when it is free from the control of its vibrating devices.

4. The combination, in a saw tooth grinding machine, of a fixed frame having an opening therein, a pivotally mounted carrier frame also having an opening therein, and means for vibrating said carrier frame, said means including a removable connecting pin adapted, when removed, to fit the openings in the fixed frame and the carrier frame and thereby lock the two together.

5. The combination, in a saw tooth grinding machine, of means for mounting the saw so that it is free to rotate, a grinding disk, a swinging hanger frame carrying said disk back and forth across the toothed portion of the saw, a pawl for engaging the teeth of the saw and imparting forward movement thereto, a rock shaft for actuating said pawl, and a shaft disposed at right angles to said rock shaft and provided with means for vibrating the hanger frame and imparting rocking movement to said rock shaft.

6. The combination, in a saw tooth grinding machine, of means for mounting the saw so that it is free to rotate, a grinding disk, a swinging hanger frame carrying the grinding disk back and forth across the toothed periphery of the saw, a pawl for engaging the teeth of the saw and imparting forward movement thereto, a rock shaft for operating said pawl, and a shaft disposed at right angles to the rock shaft and having a cam for actuating said rock shaft and a crank pin connected to the swinging hanger frame.

7. The combination, in a saw tooth grinding machine, of means for mounting the saw so that it is free to rotate, a grinding disk, a swinging hanger frame carrying said grinding disk back and forth across the toothed periphery of the saw, a pawl for engaging the teeth of the saw and imparting forward movement thereto, a rock shaft for operating said pawl, and a shaft disposed at right angles to said rock shaft and having a duplex cam for actuating said rock shaft and a crank pin connected to the swinging hanger frame.

8. The combination, in a saw tooth grinding machine, of a grinding disk, means for imparting back and forth movement thereto across the toothed periphery of the saw, means for mounting the saw so it is free to rotate, and means for moving the saw forward to the extent of one tooth after the forward swing of the grinding disk and again after the backward swing of the same.

9. The combination, in a saw tooth grinding machine, of a grinding disk, means for imparting back and forth movement thereto across the toothed periphery of the saw, means for moving the disk up and down both on the forward and backward swing of the same, means for mounting the saw so that it is free to rotate, and means for moving the saw forward to the extent of one tooth after the forward swing of the grinding disk and again after the backward swing of the same.

In testimony whereof, I have signed my name to this specification, in the presence of two subscribing witnesses.

WM. H. LUCAS.

Witnesses:
 HAMILTON D. TURNER,
 KATE A. BEADLE.